Feb. 24, 1970  W. L. STURGEON  3,496,657
HOLDER ACCOMMODATING DIFFERENT SIZE TEETH
Filed Jan. 3, 1967  2 Sheets-Sheet 1

INVENTOR.
WALTER L. STURGEON
BY
PATENT ATTORNEY

Feb. 24, 1970        W. L. STURGEON        3,496,657
HOLDER ACCOMMODATING DIFFERENT SIZE TEETH
Filed Jan. 3, 1967        2 Sheets-Sheet 2

INVENTOR.
WALTER L. STURGEON
BY
PATENT ATTORNEY

United States Patent Office 3,496,657
Patented Feb. 24, 1970

3,496,657
HOLDER ACCOMMODATING DIFFERENT SIZE TEETH
Walter L. Sturgeon, Campbell, Calif., assignor to Gerald A. Petersen, Sunnyvale, Calif.
Filed Jan. 3, 1967, Ser. No. 606,733
Int. Cl. E02f 9/28
U.S. Cl. 37—142   10 Claims

ABSTRACT OF THE DISCLOSURE

A tooth holder is provided to receive pronged-type teeth such as those shown in Patent 2,968,880, the size of the recesses being sufficient to accommodate large teeth, but where small teeth are desired, a spacer may be used to fill the gaps in the recesses so that the prongs are held firmly in place. Where job conditions require larger teeth, they may be used but when the job conditions are less severe the smaller teeth may be used without replacing the holders. The resilient retainer is located in such manner as to bias the tooth in a direction seating the same more securely in the sockets provided and preferably the sides of the prongs are slanted and the walls of the recess are correspondingly slanted so that the resilient retainer jams the prongs securely in the sockets.

---

This invention relates to a tooth holder formed with a pair of recesses to receive the prongs of the type of tooth shown in Patent 2,968,880. Teeth of this type have become commercially highly successful and are produced in a variety of sizes depending upon the operating conditions to which the tooth is subjected. Heavy duty teeth having prongs of thick cross-section are used under severe operating conditions but because of the high cost of teeth it is economically desirable to replace them with smaller cross-section teeth where operating conditions are less severe. Since the tooth holders are conventionally welded or bolted to the equipment, changing tooth holders is time consuming. The present invention provides a means for accommodating different sized prongs in the same holder. To prevent rocking of the small sized teeth in their sockets, a spacer is provided which fills the gaps occasioned by the different prong sizes. Various means may be used to secure the spacer in position against unintentional dislodgment.

Teeth of the type shown in Patent 2,968,880 are usually forged and although the cross-section of the prongs is theoretically rectangular, in practice the forging dies require a slight taper such as 7°. The walls of the recess are similarly tapered in accordance with the present invention and the resilient insert which restrains the tooth from unintentional dislodgment is so located as to bias the sloping tooth prong and socket wall surfaces into a wedging engagement which reduces rocking or wobbling of the tooth in its holder.

Other objects of the present invention will become apparent upon reading the following specification and referring to the accompanying drawings in which similar characters of reference represent corresponding parts in each of the several views.

Figure 1:
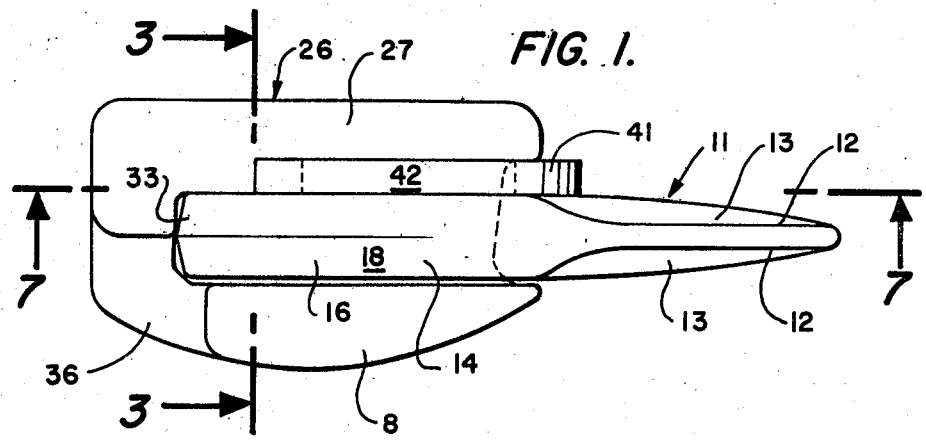

In the drawings:
FIG. 1 is a side elevational view showing a small sized tooth in position in the tooth holder with a spacer in place.

Figure 2:
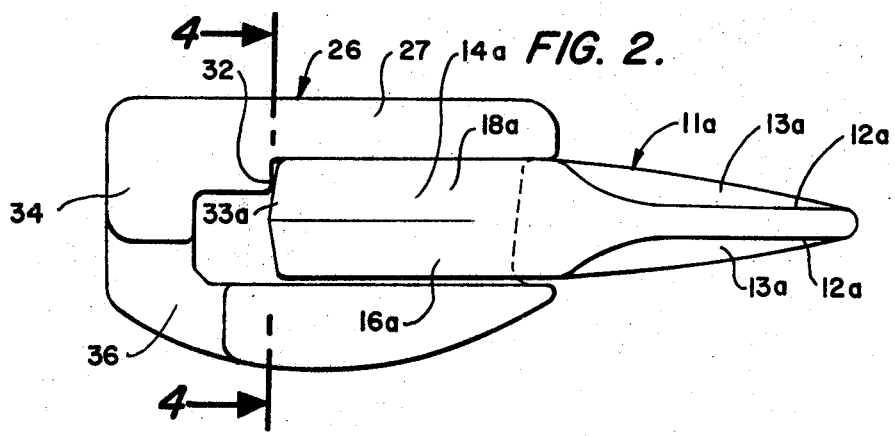
Figures 3, 4:
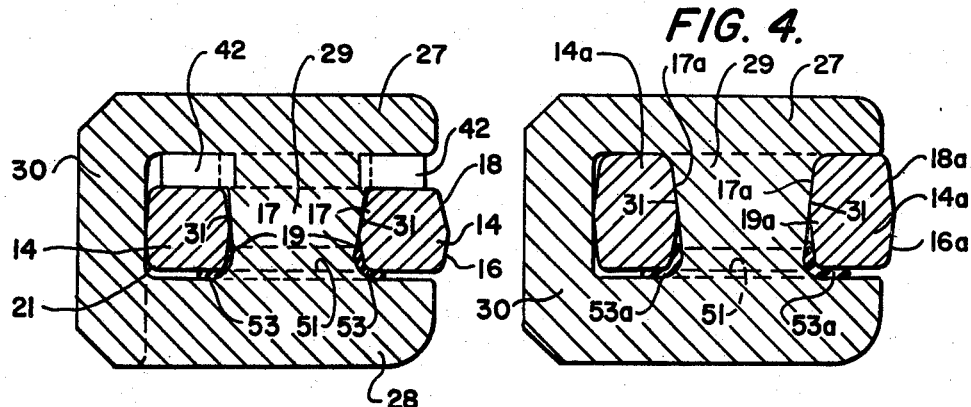
Figure 5:
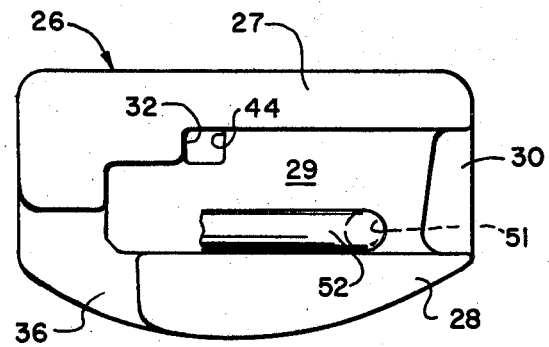
Figure 6:
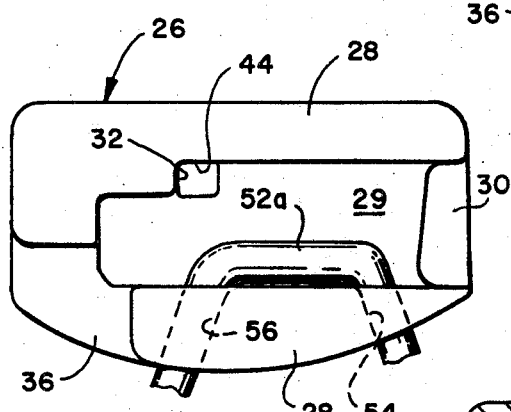
Figure 7:
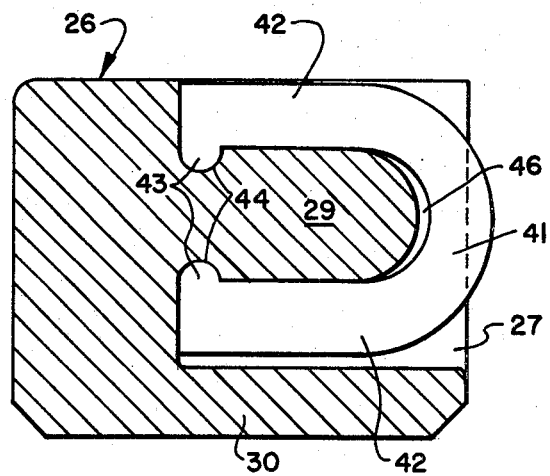
Figure 8:
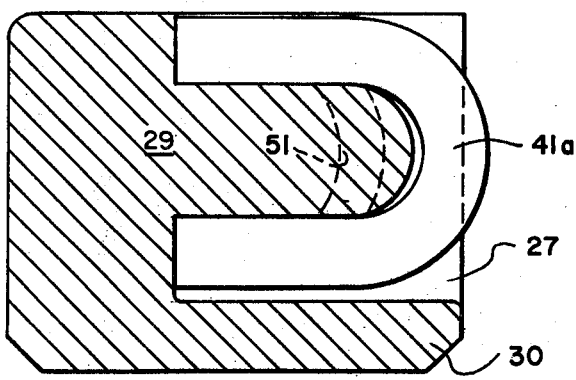

FIG. 2 is a view similar to FIG. 1 showing a large sized tooth in the holder.
FIGS. 3 and 4 are respectively transverse sectional views taken substantially along the lines 3—3 and 4—4 of FIGS. 1 and 2, respectively.
FIG. 5 is a side elevation of the tooth holder with the tooth removed.
FIG. 6 is a view similar to FIG. 5 of a modification.
FIG. 7 is a sectional view taken substantially along the line 7—7 of FIG. 1 showing one form of spacer and means for retaining the same in place.
FIG. 8 is a view similar to FIG. 7 of a modified spacer.

Teeth 11 of the type shown in Patent 2,968,880 have tapered distal top and bottom faces 12 which, in the form of the invention illustrated herein, have longitudinally reinforcing ribs 13, it being understood that the form of the distal portion of the tooth is subject to wide variation. The proximal end of the tooth is divided by a longitudinally extending slot into two prongs 14 which are roughly rectangular in cross-section, but in a preferred form of the invention, as is illustrated in the accompanying drawings, the sides of the prong above a medial plane 16 taper upwardly-inwardly as indicated by reference numerals 17, 18 and below said plane 16 taper downwardly-inwardly as indicated by reference numerals 19, 21. The prongs 14a shown in FIG. 2 differ from the prongs 14 shown in FIG. 1 in that the former are thicker and shorter and the distal portions are correspondingly larger. Corresponding elements in the form of tooth shown in FIG. 2 are designated by the same reference numerals followed by the subscript *a* as used in FIG. 1.

The tooth holder 26 is the same in both FIGS. 1 and 2 and an important feature of the invention is the fact that such holder 26 accommodates both size teeth. Holder 26 has top and bottom flanges 27, 28 interconnected by a web 29 which is generally dimensioned to fill the slot between prongs 14 or 14a. In the particular version of holder 26 illustrated, one side of the holder is closed off by a vertical side 30 which may be used to facilitate welding to a tooth holding plate or for other purposes, but the provision of such side 30 is optional. Theoretically, the web 29 is rectangular, but in practice as is best shown in FIG. 4, the walls 31 of web 29 slant upwardly-outwardly at an angle complementary to the angle of the walls 17a, which angle is preferably about 7°. The spacing between flanges 27 and 28 is large enough to accommodate the largest size prongs 14a with which the holder may be used. A step 32 may be formed extending downward from flange 27 to abut the back end 33 of the large sized tooth 11a which may be shorter than tooth 11. The rear of the holder 26 may be closed off with a back wall 34 which abuts the rear end of the prongs 14 of the small sized tooth 11, an opening 36 being provided through which a tool may be inserted to drive either the tooth 11 or 11a out of its socket. The provision of step 32 is optional but it is desirable in those instances where it is intended that the back end 33a of the tooth 11a seat against the back of the holder recess rather than in front of the web 29 seating against the front wall of the slot between the prongs.

As best shown in FIGS. 1 and 3, where the small sized tooth 11 is used there is a gap between the flange 27 and the top of the prong. Spacer 41 is used to fill this gap. Spacer 41 is generally horseshoe shaped having a thickness approximately equal to the gap between the top of the prong 14 and the flange 27, a spacing between the legs 42 thereof to straddle the web 29 and a length to fit within the dimensions defined by the step 32. Various means may be used to secure the spacer 41 in place. In the form of the invention shown in FIG. 7, lugs 43 are formed on the inner edges of legs 42 and corresponding depressions 44 formed in the walls of web 29 so that the spacer 41 may be snapped into place and may be removed by inserting a tool through the gap 46 at the front of the web 29. In the form of the spacer 41a shown in FIG. 8 the depressions 44 are omitted. The spacer 41a may be made of a magnetic material so that it comprises in effect a horseshoe magnet and thus is held in place against unintentional dislodgment by magnetic attraction. Other means may be employed to hold the spacer in position. The aforementioned Patent 2,968,880 discloses a hole 41 through the web 32 of said patent which is located midway between the top and bottom flanges of the tooth holder. In the present invention, a preferred location for a hole 51 is shown located immediately above lower flange 28. As best shown in FIG. 8, said hole 51 may be curved rather than straight—i.e., the central portion thereof is spaced forwardly and the outer ends spaced rearwardly thereof. A resilient insert 52 is installed in hole 51 and its ends protrude out of the ends of the hole. Hence, when the pronged tooth is forced into the holder, whether the tooth is of the small size 11 or the large size 11a, the ends of the insert 52 are forced rearwardly. This arrangement of the hole 51 and consequent location of the end of insert 52 has certain advantages. For manufacturing reasons, a clearance must exist between the prongs 14 or 14a and the adjacent walls of the recess into which it fits. The resilient insert accommodates tolerances in the size of the parts, as well as restraining unintentional withdrawal of the tooth from its socket. As best shown in FIGS. 3 and 4, compression of the ends 53, 53a forces the prongs 14 or 14a upwardly until the tops of the prongs engage the spacer legs 42 (FIG. 3) or the top flange 27 (FIG. 4). Particularly when the inner sides 17 or 17a of the prongs are slanted and the web walls 31 are correspondingly slanted, the wedging of the prongs against the top and sides of the sockets accomplishes a more positive location of the tooth relative to its holder and more effectively resists any tendency of the tooth to wobble in its socket. A second advantage of the location of hole 51 is the fact that grooves corresponding to the grooves designated by reference numeral 43 of Patent 2,968,880 may be eliminated in that there is space in the sockets for the resilient insert to be compressed. Elimination of the grooves prolongs the die life of equipment used to force the socket without detracting from the effectiveness of the retaining action. It will be seen by comparison of FIGS. 3 and 4 that the location of hole 51 and the consequent location of retainer 52 accomplishes a wedging of the prongs against the upper surfaces of the sockets whether the tooth is of the small or large size and whether or not the spacer 41 is required.

FIG. 6 shows an alternate location of retainer 52a. A first upwardly-rearwardly slanted hole 54 is formed in bottom flange 28 adjacent the front of the holder. A second upwardly-forwardly slanted hole 56 is located toward the rear of the recess. Retainer 52a is bent in approximately U-shape and has its end extending out through holes 54 and 56. The holes 54, 56 may be formed in either of the recesses or both. The retainers 52a not only frictionally restrain withdrawal of the tooth from the socket but further accomplish the upward wedging action which has been described with reference to FIGS. 3, 4 and 5.

What is claimed is:

1. A tooth holder for teeth of at least two different proximal end thicknesses comprising a holder portion formed with a recess dimensioned to receive the proximal end of the thickest of said different teeth, a spacer fitting in said recess having a thickness approximately equal to the difference in thickness between the thickest and next thickest of said teeth, cooperating means on said spacer and holder portion to detachably retain said spacer in said recess, and a retainer engaging said tooth and holder independently of said spacer to hold said tooth in said holder against unintentional dislodgement, said recess being stepped to form a step to provide a thinner recess portion rearward of said step and a thicker recess portion forward of said step, said spacer of restricted length to fit forward of said step, whereby said holder accommodates thinner and longer proximal tooth ends and thicker and shorter proximal tooth ends dependent on the presence or absence of said spacer in said recess.

2. A tooth holder according to claim 1 in which said holder portion comprises top and bottom flanges and a web interconnecting said flanges, said first-mentioned recess on one side of said wab between said flanges, said holder portion formed with a second recess on the side of said web opposite said first-mentioned recess, said spacer fitting into both said recesses.

3. A tooth holder according to claim 2 in which said spacer is horseshoe shaped.

4. A tooth holder according to claim 2, in which the sides of said web slant outward toward a first of said flanges and in which said holder portion is formed with at least one aperture vicinal the other of said flanges, said aperture communicating with at least one said recess, and in which said retainer is resilient and is disposed partially in said aperture and partially in said recess.

5. In combination, a tooth holder according to claim 4 and a tooth formed at its proximal end with prongs generally complementary to said recesses, at least one wall of each said prong adjacent said web slanting outward toward said first flange, said retainer deformed within at least one said recess and frictionally engaging one said prong to restrain unintentional withdrawal of said tooth from said holder, said retainer also biasing one said prong toward said first flange to wedge said one prong against both said first flange and said web for positive location of said tooth in said tooth holder.

6. In combination a tooth holder having top and bottom flanges and a web interconnecting said flanges, said flanges and web defining a pair of recesses, the walls of said web slanting outward toward a first of said flanges, said holder formed with at least one aperture communicating with at least one said recess vicinal the other of said flanges, a tooth formed at its proximal end with prongs generally complementary to said recesses, at least one wall of each said prong adjacent said web slanting outward toward said first flange, and a resilient retainer disposed partially in said aperture and partially in said recess, said retainer deformed within at least one said recess and frictionally engaging one said prong to restrain unintentional withdrawal of said tooth from said holder, said retainer also biasing said one prong toward said first flange to wedge said one prong against both said first flange and said web for positive location of said tooth in said holder.

7. The combination of claim 6 in which walls of said prong are slanted outward toward both top and bottom, said tooth formed with a reversible distal cutting edge, whereby said retainer biases said prong to wedge said prong against both said first flange and said web when turned in a first direction and when inverted in a second direction.

8. The combination of claim 6 in which said aperture extends through said web adjacent said second flange.

9. The combination of claim 6 in which said aperture extends through said second flange.

10. The combination of claim 9 in which said holder is formed with a second aperture through said second flange rearward of said first-mentioned aperture, said retainer reversely bent with its ends in said apertures and its portion intermediate said ends in said recess.

(References on following page)

References Cited

UNITED STATES PATENTS

| | | | |
|---|---|---|---|
| 1,220,186 | 3/1917 | Chambers | 37—142 |
| 2,403,078 | 7/1946 | Hettelsater | 37—142 XR |
| 2,780,014 | 2/1957 | Arps | 37—142 XR |
| 2,968,880 | 1/1961 | Peterson | 37—142 |
| 3,041,752 | 7/1962 | Evans | 37—142 |
| 3,136,077 | 6/1964 | Troeppl | 37—142 |
| 3,292,280 | 12/1966 | Launder et al. | 37—142 |
| 3,292,281 | 12/1966 | Petersen | 37—142 |
| 3,305,954 | 2/1967 | Troeppl et al. | 37—142 |
| 3,323,235 | 6/1967 | Petersen | 37—142 |
| 3,364,602 | 1/1968 | Renziaglia | 37—142 XR |

EDGAR S. BURR, Primary Examiner